United States Patent
van den Berg et al.

(10) Patent No.: US 6,493,071 B2
(45) Date of Patent: Dec. 10, 2002

(54) IMPLEMENT FOR DETECTING PHYSICAL ABNORMALITIES IN MILK

(75) Inventors: Karel van den Berg, 2971 BR Bleskensgraaf (NL); Helena Geralda Maria Vijverberg, 3141 GH Maassluis (NL)

(73) Assignee: Lely Enerprises A.G., Zug (CH)

( * ) Notice: Subject to any disclaimer, the term of this patent is extended or adjusted under 35 U.S.C. 154(b) by 0 days.

(21) Appl. No.: 09/965,081

(22) Filed: Sep. 28, 2001

(65) Prior Publication Data

US 2002/0054831 A1 May 9, 2002

Related U.S. Application Data

(63) Continuation of application No. PCT/NL01/00011, filed on Jan. 9, 2001.

(30) Foreign Application Priority Data

Feb. 2, 2000 (NL) .............................................. 1014260

(51) Int. Cl.$^7$ .............................. G01J 3/50; A01J 7/00; A01J 5/007
(52) U.S. Cl. .......................... 356/72; 356/402; 356/425; 119/14.08; 119/14.14
(58) Field of Search ................................. 356/402, 425, 356/72, 73, 406; 119/14.02, 14.08, 14.14, 14.18, 14.16

(56) References Cited

U.S. PATENT DOCUMENTS 4,190,020 A * 2/1980 Tamas et al. ............. 119/14.08
6,038,030 A * 3/2000 van Den Berg ............. 356/425

FOREIGN PATENT DOCUMENTS

NL 1004980 * 9/1998

* cited by examiner

Primary Examiner—F. L. Evans
(74) Attorney, Agent, or Firm—Penrose Lucas Albright

(57) ABSTRACT

An apparatus for detecting physical abnormalities in milk which comprises a light source for irradiating milk with light of red or green or blue colors or any combination of such colors. The intensity of light reflected or diffused or transmitted, or any combination thereof, by the milk, or from background light of the milk, is measured by light sensors. A computer processes the measurement data and is programmed to select, based on comparisons of the values derived from the measured light intensities with reference values, a diagnostic basis or diagnostic bases for abnormalities in the milk from a plurality of diagnostic bases of possible abnormalities stored in the memory of the computer.

20 Claims, 1 Drawing Sheet

Figure 1:
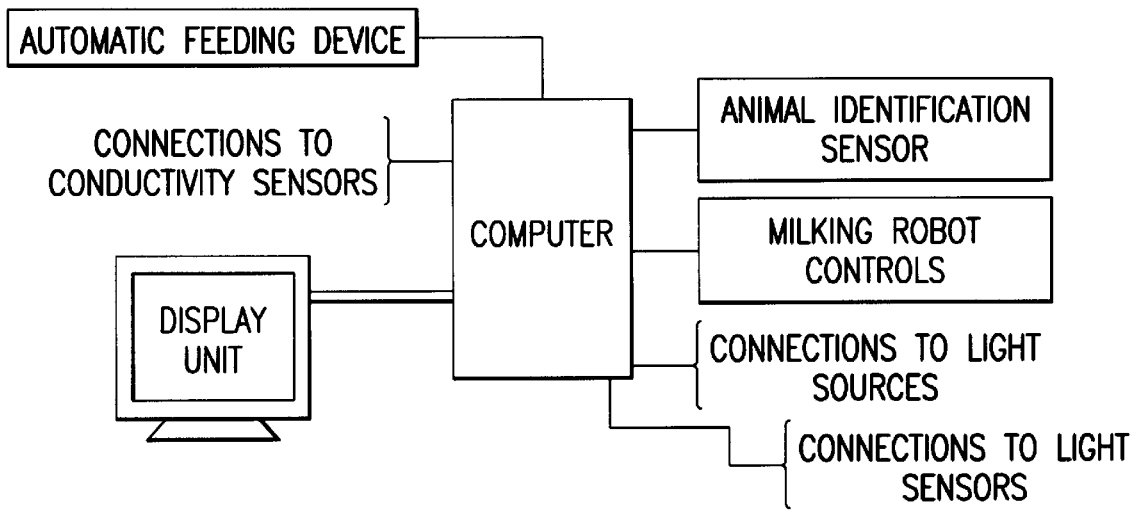
Figure 1:
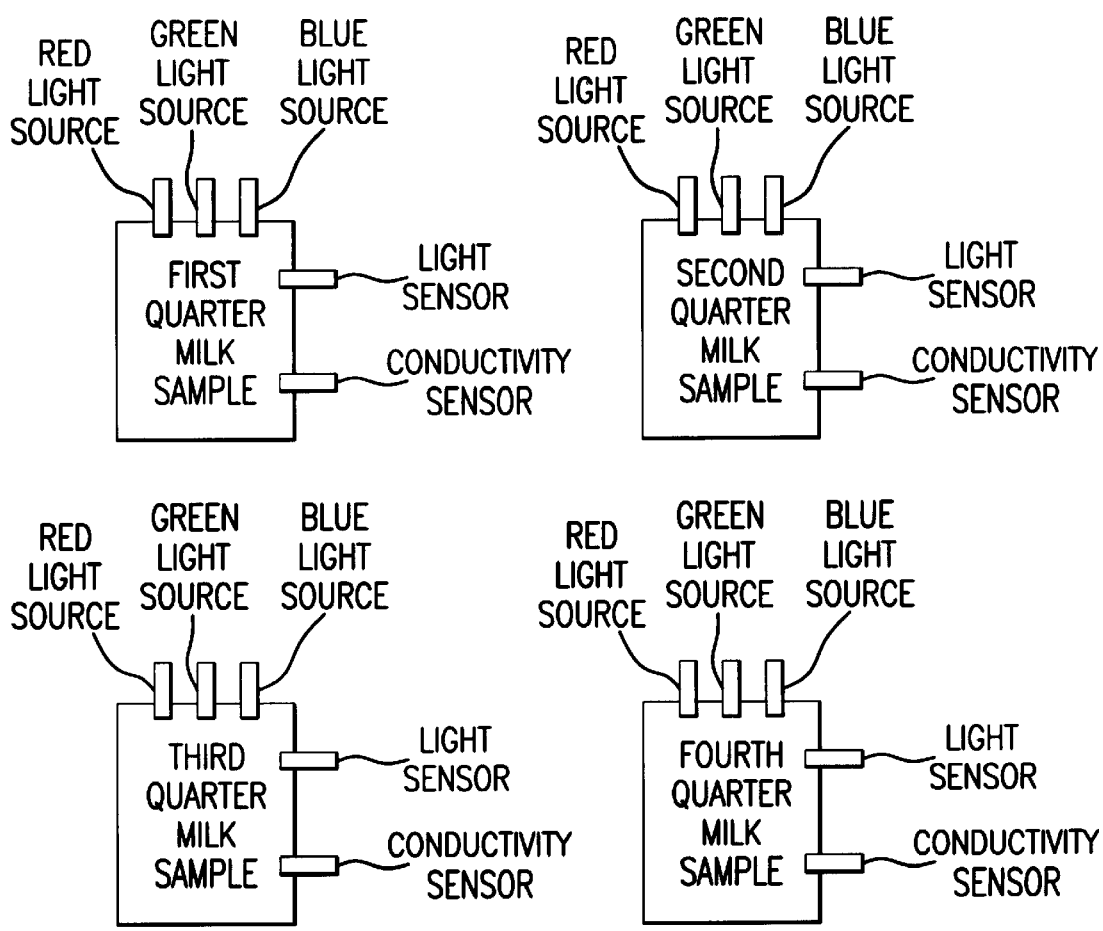

IMPLEMENT FOR DETECTING PHYSICAL ABNORMALITIES IN MILK

RELATED APPLICATION

This is a Continuation of International Application No. PCT/NL01/00011, filed Jan. 9, 2001.

FIELD OF THE INVENTION

The invention relates to an apparatus for detecting physical abnormalities in milk by subjecting the milk to irradiation by one or more lights of colors, red, green and blue, measuring the intensity of light reflected or background light from the irradiated light, and processing the measured data with a computer. The invention further relates to a milking robot which is provided with the apparatus.

BACKGROUND OF THE INVENTION

Such an apparatus is known from Netherlands patent application NL-1004980 (see U.S. Pat. No. 6,038,030). The presence of particular substances in the milk can be detected by means of a known color sensor measuring system. A disadvantage thereof is that a user often has to make a further analysis of the milk condition on the basis of the detected substances. Moreover, the results are not very reliable.

SUMMARY OF THE INVENTION

The invention aims at further developing and improving such an apparatus. According to the invention, this is achieved by programming the computer to recognize and identify one or more diagnostic indicators based on a comparison of values derived from the measured light intensities reflected directly and derived from the milk being irradiated by the light source or sources.

The values derived from the measured light intensities may be measured may be said measured values themselves, but preferably values corrected by means of the computer are determined and used. For that purpose the computer is programmed to determine corrected values as said values derived from the measured light intensities, the correction compensating for the influence of the temperature of the light source or of the milk or both on the measured intensities. The fact is that particularly the temperature of the light source, such as a LED, has proved to influence the measured values of the intensities. The measured values may be converted by the computer to measured values related to a temperature of, for example, 25° C.

The computer may further be programed to determine corrected values as said values derived from the measured light intensities, the correction compensating for differences between the light sensors used. The fact is that different specimens of a light sensor may have mutually differing measuring characteristics. By means of the correction , undesired temperatures influences or differences between the sensors used or both such factors are thus compensated for. In this manner the reliability of the apparatus is enhanced.

Reference values may be used which are fixed values (such as those of reference milk). However, preferably dynamic values are used, such as average values over the last milkings of a group of animals. Preferably the computer uses information in relation to the identity of the animals that provided the analyzed milk. The diagnostic possibilities stored comprise syndromes for the animal from which the relevant milk has been provided, milk quality indications and the presence of particular substances in the milk.

Other objects, adaptabilities and capabilities will appear as the description progresses, reference being had to the accompanying drawing in which:

FIG. 1 is a diagrammatic representation of the invention.

DETAILED DESCRIPTION OF THE PREFERRED EMBODIMENTS

The invention will be explained hereinafter in further detail with reference to examples:

The apparatus is further provided with a display unit, the computer being suitable for displaying, via said display unit, measurement data or results or processed measurement data or a selected diagnosis or diagnoses or any combination of the foregoing. In this manner the apparatus is user-friendly.

The apparatus may further be provided with means for measuring the conductivity of the milk, as such, or of samples of same, the computer being suitable for comparing values derived from the measured values of the conductivity with further reference values. The derived values may again be the result of a correction or conversion carried out with the aid of the computer. Further reference values are again fixed or dynamic values. By combining measurement data of the light intensity with measurement data of the conductivity, there can be achieved a high degree of reliability in the selection of a diagnosis or diagnoses.

The apparatus is preferably designed as a quadruple apparatus for carrying out measurements per udder quarter with cows.

The computer is programmed to select the diagnosis "mastitis; pathogen: *E-coli*" for an udder quarter upon detection by the light sensors of a decreased intensity of diffused light of a blue, a green, and a red color for the relevant udder quarter relative to the reference values. When the measured intensity of the diffused light or the value derived therefrom by the computer for blue, green, and red light (or any combination of such colors) is at least 10% lower than the reference value, then the computer selects the diagnosis that the udder quarter related to the relevant milk is affected by mastitis caused by *E-coli* bacteria.

It has been found that in measurements on colostrum the intensity of diffused blue light is lower than it normally is. The computer is programmed to select the diagnosis "colostrum" upon detection of the light sensors of a decreased intensity of diffused light of a blue color for all the udder quarters relative to the reference values.

When for an udder quarter the intensity of diffused blue light is lower than it normally is, then we are dealing with mastitis. The computer is programmed to select the diagnosis "mastitis" for an udder quarter upon detection by the light sensors of a decreased intensity of diffused light of a blue color for the relevant udder quarter relative to the reference values.

At a decreased intensity of diffused blue light combined with a somewhat less decreased intensity of diffused green light it is very likely that we are dealing with mastitis. Therefore the computer is programmed to select the diagnosis "mastitis" for an udder quarter upon detection by the light sensors of a decreased intensity of diffused light of a blue color for the relevant udder quarter relative to the reference values and a less decreased intensity of diffused light of a green color for the relevant udder quarter relative to the reference values.

The computer is further programmed to select the diagnosis "mastitis" for an udder quarter upon detecting by the light sensors of a decreased intensity of diffused light of a blue color for the relevant udder quarter relative to the reference values in combination with detection of an increased conductivity for the relevant udder relative to the further reference values. Also this combination of measured values indicates mastitis.

The computer is programmed to select additionally the diagnosis "pathogen: SAU (staphylococcus aureus)" for an udder quarter upon detection by the light sensors of an also slightly decreased intensity of diffused light of a red color for the relevant udder quarter relative to the reference values. The computer is programmed to select additionally the diagnosis "pathogen: E-coli" for an udder quarter upon detection by the light sensors of an also strongly decreased intensity of diffused light of a red color for the relevant udder quarter relative to the reference values. In this manner the apparatus provides a more detailed diagnosis for the abnormalities in the milk.

The computer may further be programmed to select the diagnosis "blood" for an udder quarter upon detection by the light sensors of a decreased intensity of diffused light of both a green and a blue color for the relevant udder quarter relative to the reference values.

The computer is programmed to select the diagnosis "blood" for an udder quarter upon detection by the light sensors of a decreased intensity of diffused light of both a green and a blue color for the relevant udder quarter relative to the reference values in combination with detection of a hardly deviating conductivity for the relevant udder quarter relative to the further reference values. The combination of said measured values has proved to provide a reliable diagnosis.

The computer may also be programmed to select the diagnosis "mastitis"; pathogen: E-coli" for an udder quarter upon detection by the light sensors of an increased intensity of transmitted light of a green as well as a blue and a red color for the relevant udder quarter relative to the reference values. The increased transmission values also indicate an udder inflammation by E-coli bacteria.

The computer is preferably programmed to select and perform one or more actions to be carried out on the basis of the selected diagnosis or diagnoses from a plurality of action possibilities stored in the computer memory. The action possibilities as stored comprise, for example, reporting in an appropriate manner the identify of the relevant animal. Upon detection of a particular syndrome, for example, the computer may put the identity of the relevant animal on an attention list or on a separation list in the computer, so that required further steps can be taken.

The computer my also be connectable to further equipment and then be programmed to select one or more actions to be carried out on the basis of the selected diagnosis or diagnoses from a plurality of possible actions stored in the computer. In such case, the computer is suitable for actuating said further equipment in such a manner that the further equipment performs the selected actions. The computer may be connected, for example, to an automatic feeding device. In case of a particular diagnosis, the computer sends a control signal to the feeding device, on the basis of which the composition of the feed for the relevant animal is adapted to the animal's condition. By means of a control signal the computer can also select food or supply to the animal particular medicines or perform both actions, with the aid of a metering device.

The apparatus described is extremely suitable for being used with a milking robot in an automated milking system. Abnormalities in the milk can be detected quickly, efficiently and reliably by means of the apparatus. The actions required can, at least partially, be carried out automatically by means of the described apparatus.

Although we have disclosed the preferred embodiments of our invention it is to be understood that it is capable of other adaptations and modifications within the scope of the following claims.

Having thus disclosed our invention, what we claim as new and to be secured by Letters Patent of the United States of America is:

1. An apparatus for diagnosing pathological conditions in animals that produce milk by analyzing abnormalities in such milk, the apparatus comprising: a light source that irradiates milk produced by said animal with light consisting of light selected from a red color or a green color or a blue color or any combination thereof; a light sensor disposed to measure the intensity of light consisting of light selected from light that is reflected from said milk or is diffused through milk or is transmitted by said milk or is background light produced by said milk or is any combination thereof; a computer for processing measurement data from said light sensor, said computer programmed to select at least one diagnosis for pathological conditions which may exist in said animal that produces said milk from a plurality of diagnostic possibilities stored in said computer on the basis of comparing values derived from the light intensities measured by said light sensor with reference values of said plurality of diagnostic possibilities.

2. An apparatus in accordance with claim 1 wherein said computer is further programmed to determine corrected values of said measurement values, said corrected values having been corrected to compensate for the influence of the temperature of said light source.

3. An apparatus in accordance with claim 1 wherein said computer has been further programmed to correct said measurement data to compensate for the influence of the temperature of said milk.

4. An apparatus in accordance with claim 1 which comprises at least one further light sensor, said computer being further programmed to correct said measurement data to compensate for differences between said first mentioned light sensor and said further light sensor depending upon which light sensor is used to make said measurement data.

5. An apparatus in accordance with claim 1 which comprises a display unit, said computer adapted to display information on said display unit which consists of said measurement data or the results of said measurement data as processed or the selected diagnosis or the selected diagnoses or any combination thereof.

6. An apparatus in accordance with claim 1 which comprises means for measuring the conductivity of said milk, said computer being programmed to compare values derived from the measured values of said conductivity with further reference values relating to the conductivity of milk which are diagnostic for pathological conditions which may exist in said animal that produced said milk.

7. An apparatus in accordance with claim 1 which comprises a quadruple implement that produces measurement data to be processed by said computer for milk from each teat of said animal.

8. An apparatus in accordance with claim 1 wherein said computer is programmed to select the diagnosis "colostrum" upon detection by said light sensor of a decreased intensity of diffused light of a blue color relative to said reference values.

9. An apparatus in accordance with claim 1 wherein said computer is programmed to select the diagnosis "mastitis"

upon detection by said light sensor of a decreased intensity of diffused light of a blue color relative to said reference values.

10. An apparatus in accordance with claim 1 wherein said computer is programmed to select the diagnosis "mastitis" upon detection by said light sensor of a decreased intensity of diffused light of a blue color relative to said reference values and a detection of a lesser decrease in intensity of diffused light of a green color relative to said reference values.

11. An apparatus in accordance with claim 6 wherein said computer is programmed to select the diagnosis of "mastitis" upon detection by said light sensor of a decreased intensity of diffused light of a blue color relative to said reference values in combination with the detection of an increased conductivity of said milk relative to said further reference values.

12. An apparatus in accordance with claim 1 wherein said computer selects the diagnosis "mastitis", said computer being programmed to select additionally the diagnosis "pathogen:SAU (staphylococcus aureus) upon detection by said light sensor of a slightly decreased intensity of diffused light of red color relative to said reference values.

13. An apparatus in accordance with claim 1 which has selected the diagnosis of "mastitis" wherein said computer is programmed to select additionally the diagnosis of "pathogen: *E-coli*" upon detection by said light of a strongly decreased intensity of diffused light of a red color relative to said reference values.

14. An apparatus in accordance with claim 1 wherein said computer is programmed to select the diagnosis "blood" upon detection by said light sensor of a decreased intensity of diffused light of both a green and a blue color relative to the said reference values.

15. An apparatus in accordance with claim 6 wherein said computer is programmed to select the diagnosis of "blood" upon detection by said light sensor of a decreased intensity of diffused light of both a green color and a blue color relative to said reference values combined with a detection of a hardly deviating conductivity relative to said further reference values.

16. A apparatus in accordance with claim 1 wherein said computer is programmed to select the diagnosis the "mastitis"; "pathogen: *E-Coli*" upon detection by said light sensor of an increased intensity of transmitted light of a green color and a blue color and a red color relevant to said reference values.

17. An apparatus in accordance with claim 1 wherein said computer is programmed to select the diagnosis "mastitis' pathogen: *E-coli*" upon detection by said light sensor of a decreased intensity of diffused light of a blue color and green color and a red color relative to said reference values.

18. An apparatus in accordance with claim 1 which is a part of an automated milking system, said computer interconnected in said automated milking system to carry out a plurality of actions based on said diagnosis which is selected by said computer.

19. An apparatus in accordance with claim 1 which is part of automated milking system which includes further equipment to which said computer is interconnected, said computer being further programmed to select at least one action to be carried out on the basis of said selected diagnosis from a plurality of action possibilities which may be carried out by said computer and are stored in said computer.

20. A milking system which includes a milking robot for automatically milking cows and an apparatus for diagnosing pathological conditions in the udder quarters of animals that produce milk by analyzing abnormalities in such milk produced by each said udder quarter, the apparatus comprising for each udder quarter: a light source that irradiates milk produced by each said udder quarter with light consisting of light selected from a red color or a green color or a blue color or any combination thereof; a light sensor disposed to measure for each said udder quarter, the intensity of light consisting of light selected from light that is reflected from said milk or is diffused through said milk or is transmitted by said milk or is background light produced by said milk or is any combination thereof; a computer for processing measurement data from said light sensor from each said udder quarter, said computer programmed to select at least one diagnosis for pathological conditions which may exist in said udder quarter that produce said milk from a plurality of diagnostic possibilities stored in said computer on the basis of comparing values derived from the light intensities measured by said light sensor for said udder quarter with reference values of said plurality of diagnostic possibilities.

\* \* \* \* \*